United States Patent
Kato et al.

(10) Patent No.: US 10,975,765 B2
(45) Date of Patent: Apr. 13, 2021

(54) OPERATION SYSTEM FOR PISTON-TYPE EXPANDER, AND OPERATION METHOD FOR PISTON-TYPE EXPANDER

(71) Applicant: ISUZU MOTORS LIMITED, Tokyo (JP)

(72) Inventors: Kota Kato, Fujisawa (JP); Susumu Fukunaga, Fujisawa (JP); Makoto Abe, Fujisawa (JP); Tomofuyu Matsuuki, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 16/971,672

(22) PCT Filed: Feb. 13, 2019

(86) PCT No.: PCT/JP2019/005153
§ 371 (c)(1),
(2) Date: Aug. 20, 2020

(87) PCT Pub. No.: WO2019/163612
PCT Pub. Date: Aug. 29, 2019

(65) Prior Publication Data
US 2020/0408146 A1    Dec. 31, 2020

(30) Foreign Application Priority Data
Feb. 21, 2018   (JP) .............................. JP2018-028949

(51) Int. Cl.
*F02B 75/32*    (2006.01)
*F02B 75/26*    (2006.01)
(Continued)

(52) U.S. Cl.
CPC .............. *F02B 75/32* (2013.01); *F01B 3/007* (2013.01); *F01B 9/02* (2013.01); *F01B 9/04* (2013.01);
(Continued)

(58) Field of Classification Search
CPC .......... F02B 75/32; F02B 75/28; F02B 75/26; F02B 75/265; F01B 9/02; F01B 3/04;
(Continued)

(56) References Cited

U.S. PATENT DOCUMENTS

| | | | |
|---|---|---|---|
| 2011/0146609 A1 | 6/2011 | Enoki | |
| 2013/0318967 A1* | 12/2013 | Gaertner | F01L 7/06 60/615 |
| 2018/0073584 A1* | 3/2018 | Tsukamoto | F16D 65/18 |

FOREIGN PATENT DOCUMENTS

| | | | |
|---|---|---|---|
| JP | S53130301 U | 11/1978 | |
| JP | S55130001 U | 10/1980 | |

(Continued)

OTHER PUBLICATIONS

International Search Report and Written Opinion for related JP App. No. PCT/JP2019/005153 dated Apr. 23, 2019. English translation provided; 8 pages.

*Primary Examiner* — Jacob M Amick
(74) *Attorney, Agent, or Firm* — Procopio, Cory, Hargreaves & Savitch LLP (57) ABSTRACT

An operation system for a piston-type expander includes: a first engaging member which is fixed to an output shaft of the piston-type expander, rotates together with the output shaft, and has a first slanting surface; a second engaging member which is rotatably disposed on the output shaft, and has a second slanting surface; and a drive device which, while keeping a rotation direction of the second engaging member around the output shaft fixed, moves the second engaging member in an axial direction of the output shaft to (Continued)

press the second slanting surface onto the first slanting surface, converts a pressing force of the second engaging member in the axial direction into a rotational torque of the first engaging member and the output shaft at a contact surface of the first and second slanting surfaces, and causes the first engaging member to rotate together with the output shaft.

4 Claims, 4 Drawing Sheets

(51) Int. Cl.
  *F01B 9/04* (2006.01)
  *F01B 3/00* (2006.01)
  *F01B 9/02* (2006.01)
  *F02B 75/28* (2006.01)
  *F01B 3/04* (2006.01)
  *F01B 9/08* (2006.01)

(52) U.S. Cl.
  CPC . *F01B 3/04* (2013.01); *F01B 9/08* (2013.01); *F02B 75/28* (2013.01); *F16C 2360/22* (2013.01)

(58) Field of Classification Search
  CPC ...... F01B 9/04; F01B 9/08; F01B 3/00; F01B 3/002; F01B 3/005; F01B 3/007; F01B 3/0073; F01B 3/0076; F16C 2360/22
  See application file for complete search history.

(56) References Cited

FOREIGN PATENT DOCUMENTS

| | | |
|---|---|---|
| JP | 2007292076 A | 11/2007 |
| JP | 2011127504 A | 6/2011 |
| JP | 2014015872 A | 1/2014 |
| JP | 2014515069 T | 6/2014 |

* cited by examiner

OPERATION SYSTEM FOR PISTON-TYPE EXPANDER, AND OPERATION METHOD FOR PISTON-TYPE EXPANDER

CROSS-REFERENCE TO RELATED APPLICATIONS

This application is a U.S. National Stage entry of PCI Application No. PCT/JP2019/005153, filed on Feb. 13, 2019, which claims priority to JP Application No. 2018-028949, filed Feb. 21, 2018. The contents of the foregoing are incorporated by reference.

TECHNICAL FIELD

The present disclosure relates to an operation system for a piston-type expander and an operation method for the piston-type expander.

BACKGROUND ART

There has been proposed an operation method for an internal combustion engine in which, when a crankshaft of the internal combustion engine has a rotation speed lower than a predetermined limit, two facing disks provided on the crankshaft are brought close to each other, and fitting portions formed on these disks are fitted to each other to adjust the crankshaft to a desired starting position (with reference to, for example, Patent Literature 1). In the technique of Patent Literature 1, rotational motion of the crankshaft is immediately stopped by engaging the fitting portions with each other with respect to the rotating crankshaft in an inertia stop process, and the rotational motion is stopped suddenly.

CITATION LIST

Patent Document

Patent Literature 1: JP-A-2007-292076

SUMMARY OF THE INVENTION

Technical Problem

Even in a piston-type expander used in a Rankin cycle system of an internal combustion engine, the startability of the expander is unstable depending on a position (phase) of a piston, so that there is a demand for a technique of adjusting the position of the piston before starting of the piston-type expander.

An object of the present disclosure is to provide an operation system for a piston-type expander and an operation method for the piston-type expander, which are capable of adjusting a position (phase) of a piston of the piston-type expander.

Solution to Problem

According to an aspect of the present disclosure, an operation system for a piston-type expander, includes:
a first engaging member which is fixed on an output shaft of the piston-type expander, rotates together with the output shaft, and has a first slanting surface;
a second engaging member which is rotatably disposed on the output shaft, and has a second slanting surface; and
a drive device which, while keeping a rotation direction of the second engaging member around the output shaft fixed, moves the second engaging member in an axial direction of the output shaft to press the second slanting surface onto the first slanting surface, converts a pressing force of the second engaging member in the axial direction into a rotational torque of the first engaging member and the output shaft at a contact surface of the second slanting surface and the first slanting surface, and causes the first engaging member to rotate together with the output shaft.

According to an aspect of the present disclosure for archiving the above-described object, an operation method for a piston-type expander is an operation method for the piston-type expander in the above-described operation system, and the operation method includes the steps of:
before the piston-type expander is started, determining whether or not to need to adjust a position of a piston of the piston-type expander; and
adjusting, in a case where it is determined that the position of the piston needs to be adjusted, the position of the piston by pressing the second engaging member onto the first engaging member to cause the output shaft to rotate by a rotational torque of the first engaging member generated by the pressing.

Advantageous Effects of Invention

According to the present disclosure, the position (phase) of the piston of the piston-type expander can be adjusted.

DESCRIPTION OF EMBODIMENTS

Hereinafter, an operation system 1 for a piston-type expander and an operation method for the piston-type expander according to an embodiment will be described with reference to the drawings. In the drawings of the present embodiment, a reciprocating direction of pistons 3a, 3b of a piston-type expander 2 is an X direction, an axial direction of an output shaft 5 of the piston-type expander 2 is an M direction, and a rotation direction of the output shaft 5 is an a direction. The operation system 1 for a piston-type expander of the present embodiment is provided in a vehicle equipped with an engine as a power source for vehicle travelling.

Figure 1:
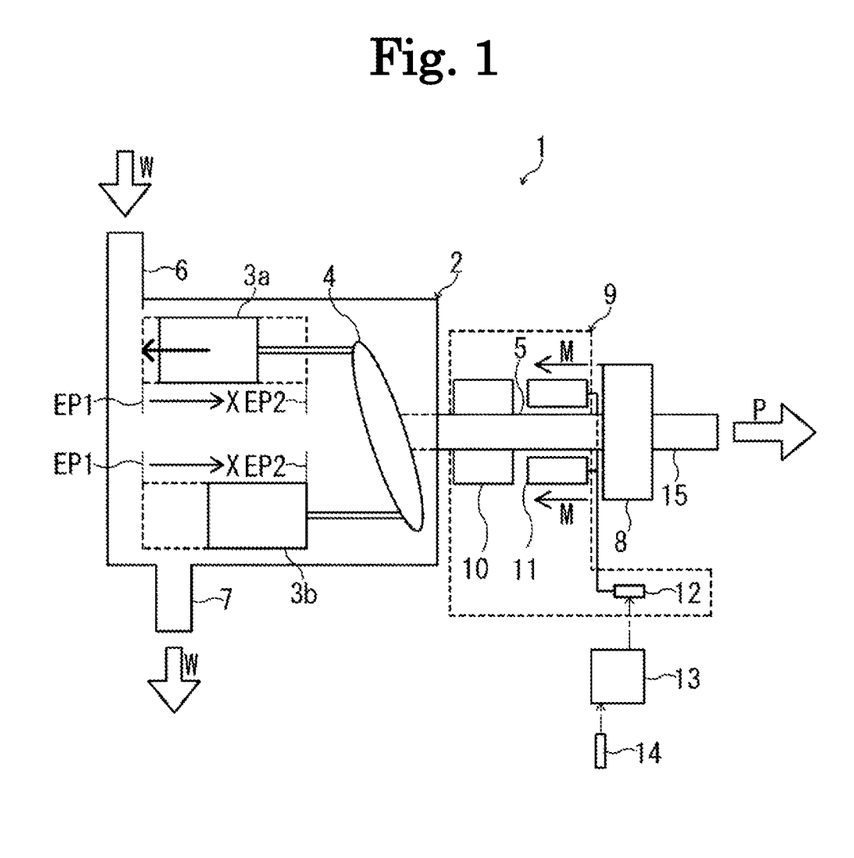
FIG. 1 is a schematic diagram illustrating a configuration of an operation system for a piston-type expander according to an embodiment.

As shown in FIG. 1, the operation system 1 for a piston-type expander according to an embodiment of the present disclosure includes a piston-type expander 2, a phase determination mechanism 9, and a one-way clutch 8.

Examples of the piston-type expander 2 can include, but are not limited to, a swash plate-type (axial-type) piston as shown in FIG. 1. The swash plate-type piston includes pistons 3a, 3b, a rotation swash plate 4, an output shaft 5, a fluid inlet 6, and a fluid outlet 7. The pistons 3a, 3b reciprocate in the X direction between an end position EP1 and an end position EP2 due to power of a working fluid W. The pistons 3a, 3b are disposed inside the expander 2 in parallel to the output shaft 5 so as to surround the output shaft 5 in the axial direction (M direction), and usually a plurality of pistons 3a, 3b are provided.

The rotation swash plate 4 is coupled (connected) to the output shaft 5, has a surface slanting with respect to the axial direction (M direction) of the output shaft 5, tip ends of the plurality of pistons 3a, 3b come into contact with and slide on the slanting surface, and the rotation swash plate 4 has a function of converting reciprocating motion (linear force) of the pistons 3a, 3b into rotational motion (rotational torque) and transmitting the rotational torque to the output shaft 5, and a converse function of converting rotational motion of the output shaft 5 into reciprocating motion of the pistons 3a, 3b.

By pressing each of the plurality of pistons 3a, 3b onto corresponding slanting surfaces of the rotation swash plate 4 in the X direction, the rotation swash plate 4 rotates, and the output shaft 5 rotates in conjunction with the rotation of the rotation swash plate 4. Rotational power of the output shaft 5 is output of the expander 2. Conversely, when the output shaft 5 rotates, the rotation swash plate 4 rotates in conjunction with the rotation of the output shaft 5, and the plurality of pistons 3a, 3b reciprocate in the X direction due to the rotation of the rotation swash plate 4. Then, a phase of the output shaft 5 connected to the rotation swash plate 4 and positions (phases) of the pistons 3a, 3b in the X direction correspond to each other.

The output shaft 5 is coupled to the rotation swash plate 4 and rotates in conjunction with the rotation swash plate 4. The fluid inlet 6 is a pipe port formed in a housing of the expander 2 in order to allow the working fluid W to flow inside the expander 2. The fluid outlet 7 is a pipe port formed in the housing of the expander 2 separately from the fluid inlet 6 in order to allow the working fluid W to flow outside the expander 2. The working fluid W flows into and out of the expander 2 via the fluid inlet 6 and the fluid outlet 7, and thus the pistons 3a, 3b are reciprocated.

The one-way clutch 8 is disposed between the output shaft 5 and a vehicle power shaft 15, and is locked when the output shaft 5 rotates in a certain direction (lock direction) to couple the output shaft 5 and the vehicle power shaft 15 so as to allow power P to be transmitted between the shafts 5 and 15 in this direction. When the output shaft 5 rotates in a direction (non-lock direction) opposite to the lock direction, the one-way clutch 8 is unlocked, and the power P cannot be transmitted between the shafts 5 and 15 in the opposite direction.

The operation system 1 for a piston-type expander of the present embodiment includes the phase determination mechanism 9. The phase determination mechanism 9 is fixed on the output shaft 5 and rotates together with the output shaft 5. Further, the phase determination mechanism 9 includes a first engaging member 10 that is fixed to the output shaft 5, rotates together with the output shaft 5, and has first slanting surfaces 10a, a second engaging member 11 that is rotatably disposed on the output shaft, and has second slanting surfaces 11a, and a hydraulic cylinder (drive device) 12 that, while keeping the rotation direction of the second engaging member 11 around the output shaft 5 fixed, moves the second engaging member 11 in an axial direction (M direction) of the output shaft 5 to press the second slanting surfaces 11a onto the first slanting surfaces 10a.

Figure 2:
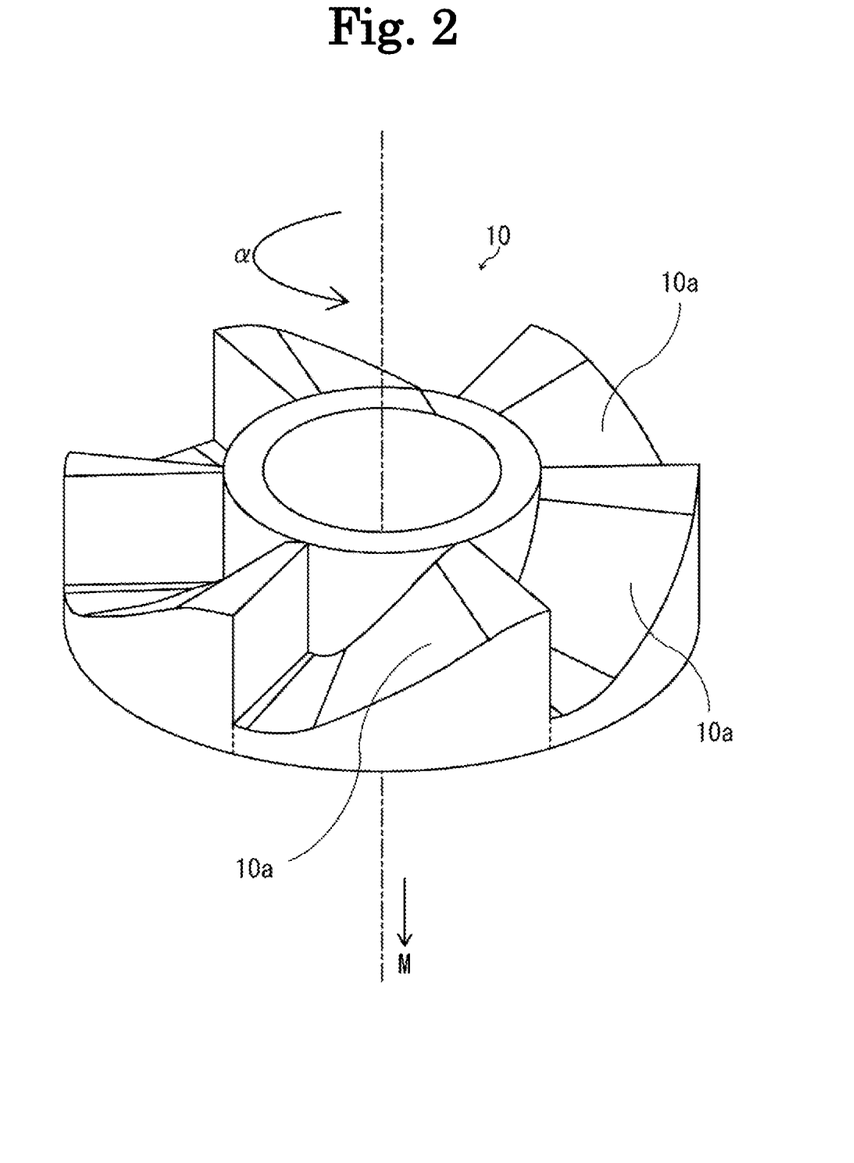
FIG. 2 is a view illustrating a configuration of a first engaging member.

The first engaging member 10 and the second engaging member 11 are formed in a disk shape, are provided with the first slanting surfaces 10a and the second slanting surfaces 11a on surface sides facing each other, and each have a saw blade shape, which is a combination of a relatively gentle-slanting surface and an upright surface that is substantially upright. The first slanting surface 10a and the second slanting surface 11a are formed on surfaces facing each other, and are formed to be contactable in a planar shape.

More specifically, the first slanting surfaces 10a of the first engaging member 10 are formed on a surface facing the second engaging member 11, and are formed in a saw blade-shaped slanting surface that have high and low portions along a circumferential direction. That is, when viewed in the circumferential direction, a highest (most protruding) portion gradually decreases, and a surface that rises toward a next slanting surface from a lowest position is the highest, and gradually decreases to the lowest position. The above shape is continuous in the circumferential direction.

Similarly, the second slanting surfaces 11a of the second engaging member 11 are formed on a surface facing the first engaging member 10, and are formed in a slanting surface having high and low portions along a circumferential direction. Further, in the circumferential direction, a highest (most protruding) portion gradually decreases, and a surface that rises toward a next slanting surface from a lowest position is the highest, and gradually decreases to the lowest position. The above shape is continuous in the circumferential direction.

Since the first slanting surface 10a and the second slanting surface 11a need to contact each other in a planar shape, the same number is formed in each circumferential direction. The first slanting surface 10a and the second slanting surface 11a have the same angle with respect to the axial direction of the output shaft 5.

Figure 3:
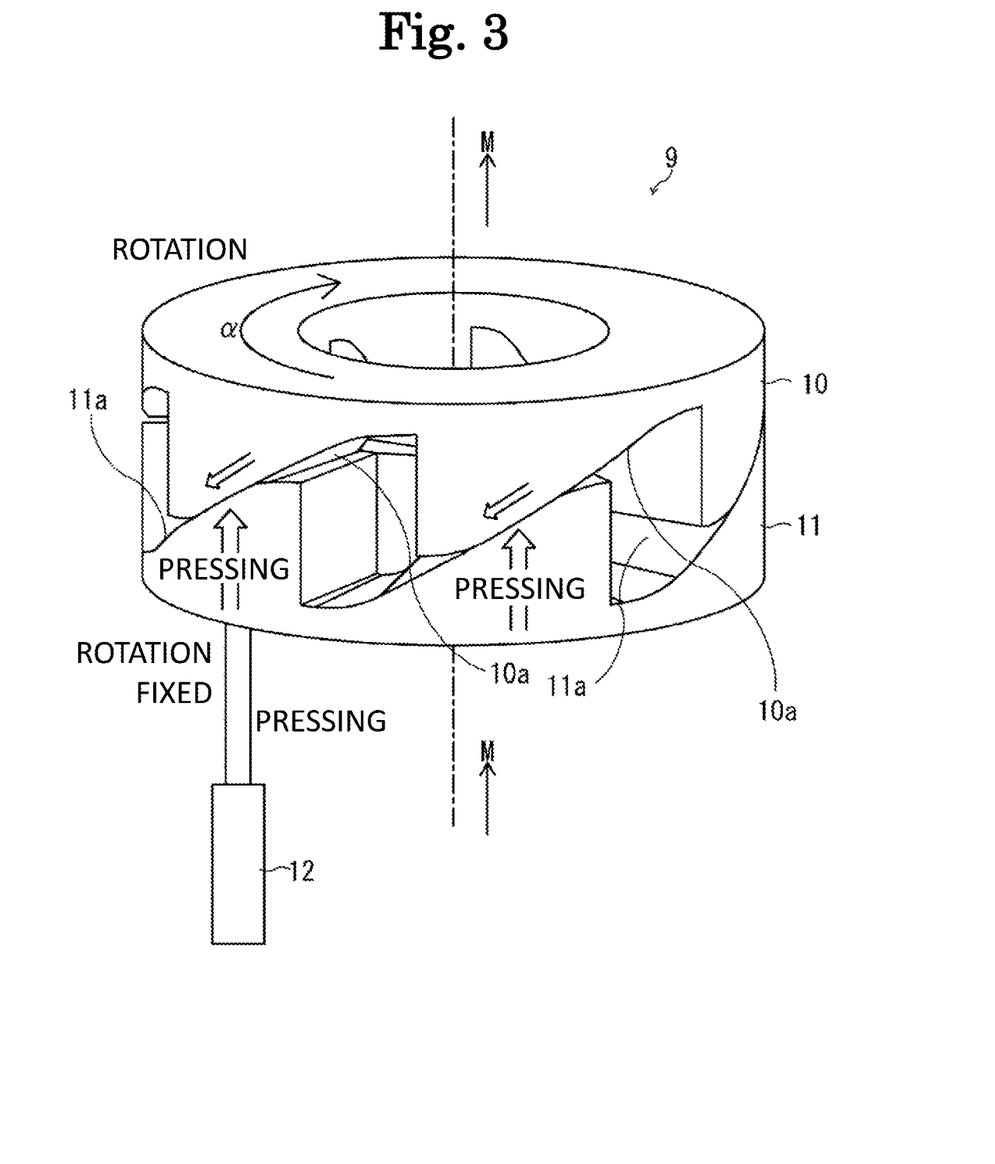
FIG. 3 is a view illustrating a state in which only the first engaging member is rotated by pressing a second engaging member onto the first engaging member.

In FIG. 3, illustration of the output shaft 5 is omitted. The output shaft 5 is fixed to the first engaging member 10, passes through a center hole of the second engaging member 11, and is rotatable with respect to the second engaging member 11. Meanwhile, the second engaging member 11 is configured to reciprocate in the axial direction M of the output shaft 5 due to expansion and contraction of a pressing portion of the hydraulic cylinder 12, and the rotation direction of the second engaging member 11 is fixed with respect to the phase determination mechanism 9. The rotation direction may be fixed by fixing or connecting the pressing portion of the hydraulic cylinder 12 to the second engaging member 11, or may be fixed by other structures.

Then, as shown in FIG. 3, the second engaging member 11 rotatably provided on the output shaft 5 is moved in the axial direction M of the output shaft 5 by the hydraulic cylinder 12 to press the first engaging member 10, thus the second slanting surfaces 11a press the first slanting surfaces 10a, since the contact surfaces (10a, 11a) are inclined with respect to the axial direction M of the output shaft 5, the rotational torque in the rotation direction (non-lock direction) α is generated, and thereby the first engaging member 10 rotates and the output shaft 5 fixed to the first engaging member 10 rotates. That is, a pressing force of the second engaging member 11 in the axial direction (M direction) of the output shaft 5 is converted into the rotational torque of the first engaging member 10 (rotational torque of the output shaft 5) on the contact surfaces between the second slanting surfaces 11a and the first slanting surfaces 10a, the first engaging member 10 is rotated together with the output shaft 5. The rotation direction is a direction (non-lock direction) opposite to the lock direction of the one-way clutch 8.

The rotation can change the phase of the output shaft 5 and change the positions (phases) of the pistons 3a, 3b, so that by an initial setting phase of the second engaging member 11 around the axial direction M of the output shaft 5 and a pushing amount of the second engaging member 11, the phase of the first engaging member 10 around the output shaft 5 can be adjusted, and the positions of the pistons 3a, 3b can be adjusted. When the rotational direction of the second engaging member 11 is fixed such that a desired target phase (target position of the pistons 3a, 3b) of the output shaft 5 is obtained when the pushing amount is the maximum, the output shaft 5 can be rotated to the target phase simply by maximizing the pushing amount.

Further, since it is sufficient to set the rotation amount of the output shaft, in other words, the movement amount of the pistons 3a, 3b to be the target phase of the output shaft 5 (target position of the pistons 3a, 3b) suitable for starting the expander 2, the output shaft 5 only needs to be rotated up to a maximum of 360 degrees/piston number Np. Therefore, the number Ns of the first slanting surfaces 10a and the second slanting surfaces 11a may be equal to or smaller than the number Np of the pistons 3a, 3b.

The operation system 1 for a piston-type expander of the present embodiment includes the control device 13. The control device 13 is hardware including a CPU for performing various types of information processing; an internal storage device capable of reading and writing programs used for performing various types of information processing and information processing results; and various interfaces, and the like. The control device 13 is electrically connected to an oil temperature sensor 14 to be described later and various devices of the hydraulic cylinder 12 via signal lines. The operation system 1 for a piston-type expander of the present embodiment includes the oil temperature sensor 14. The oil temperature sensor 14 acquires a temperature of lubricating oil for the engine.

A flow of control at the time of starting the expander 2 in the present embodiment will be described. When a driver of a vehicle including the operation system 1 of the present embodiment turns on an ignition key switch of a driver seat, warm-up of the engine is started. After the warm-up of the engine is started, the control device 13 determines that a temperature and a pressure of the working fluid W are increased to such a degree that the expander 2 can be started, when an acquired value of the oil temperature sensor 14 is equal to or higher than a preset temperature set according to experiments and the like. An exhaust gas temperature sensor may be provided in an exhaust passage of the engine, and the above determination may be performed based on an acquired value of the exhaust gas temperature sensor instead of the acquired value of the oil temperature sensor 14. Alternatively, the above determination may be performed based on both the acquired value of the oil temperature sensor 14 and the acquired value of the exhaust gas temperature sensor.

In the operation system 1 for a piston-type expander of the present embodiment, the following control is performed after the above determination is satisfied. That is, as shown in FIG. 3, during operation stop of the expander 2 (for example, before starting or immediately after stopping), the rotational torque of the first engaging member 10 and the output shaft 5 generated by pressing the second engaging member 11 onto the first engaging member 10 by the hydraulic cylinder 12 is transmitted to the plurality of pistons 3a, 3b via the rotation swash plate 4, and thus control for adjusting the positions of the plurality of pistons 3a, 3b is performed. At this time, the first engaging member 10 and the output shaft 5 rotate in the non-lock direction of the one-way clutch 8.

The rotational torque of the first engaging member 10 generated by the pressing is converted into a force in the reciprocating direction for the pistons 3a, 3b via the output shaft 5 and the rotation swash plate 4, and the force is transmitted to the plurality of pistons 3a, 3b. Due to the force in the reciprocating direction, the plurality of pistons 3a, 3b move in the X direction. The positions (phases) of the respective pistons 3a, 3b are adjusted by the movement.

After determining that the position adjustment (phase adjustment) of the respective pistons 3a, 3b is completed, the control device 13 performs a control to start the expander 2 by causing the working fluid W to flow into and out of the expander 2 via the fluid inlet 6 and the fluid outlet 7. The determination as to whether or not the position adjustment of the respective pistons 3a, 3b is completed can be easily performed, for example, by detecting the phase of the output shaft 5 in the rotation direction, and can be easily performed by adjusting the pushing amount of the second engaging member by the hydraulic cylinder 12 so as to set the phase of the output shaft 5 to be the preset target phase. When the pushing amount is set to be the target phase when the pressing amount is the maximum, the pushing amount is maximized.

Further, in the present embodiment, since an slanting angle of the first slanting surface 10a with respect to the axial direction M of the output shaft 5 is the same angle as a slanting angle of the second slanting surface 11a, members having the same shape can be used for the first engaging member 10 and the second engaging member 11, but members having different shapes may be used as long as the first slanting surface 10a and the second slanting surface 11a can contact each other, the first engaging member 10 can be efficiently rotated, and the positions of the pistons 3a, 3b can be adjusted. For example, respective thicknesses (widths in the M direction) may be different.

A control flow based on the operation system 1 for a piston-type expander of the present embodiment, in other words, an example of an operation method for a piston-type expander will be described with reference to FIG. 4. The control flow shown in FIG. 4 is a control flow performed when the expander 2 is operated.

Figure 4:
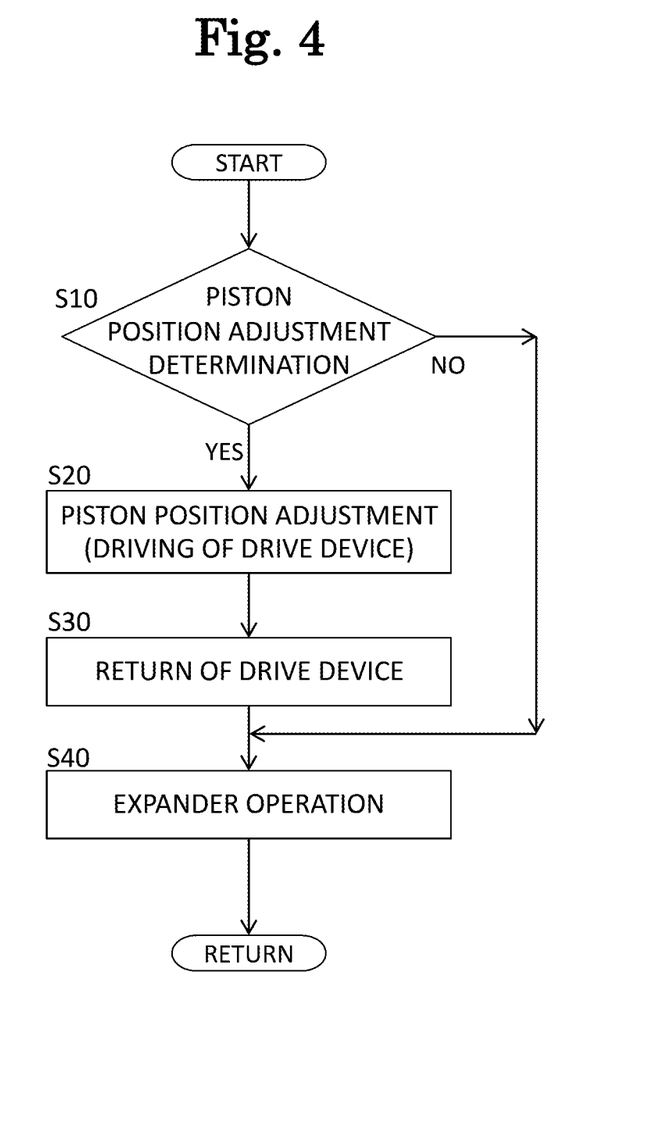
FIG. 4 is a flowchart illustrating a control flow in an operation method for the piston-type expander according to an embodiment.

When the control flow shown in FIG. 4 is started, whether or not the position adjustment of the pistons 3a, 3b is performed is determined by "piston position adjustment determination" in step S10. The determination as to whether or not the positions of the pistons 3a, 3b are adjusted is performed based on whether or not the phase of the output shaft 5 is a preset target phase for starting. The determination can be easily performed by detecting the rotation angle (phase) of the output shaft.

In a case where it is determined in step S10 that the position adjustment (phase adjustment) of the pistons 3a, 3b is not performed (NO), the process proceeds to step S40 without performing the piston position adjustment, and the operation of the expander 2 is started. When the operation is completed, the process returns.

Meanwhile, in step S10, in a case where it is determined that the position adjustment of the pistons 3a, 3b is to be performed (YES), the process proceeds to "piston position adjustment" in step S20, and in step S20, the hydraulic cylinder (drive device) 12 is driven (extended) to press the second engaging member 11 onto the first engaging member 10, the positions of the pistons 3a, 3b are adjusted together with the phase adjustment of the output shaft 5. After step S20 is performed, the process proceeds to step S30.

In "return of drive device" in step S30, the hydraulic cylinder (drive device) 12 is driven. In step S30, the hydraulic cylinder 12 is driven in a reverse direction (contracted) to separate the second engaging member 11 from the first engaging member 10 and return to a fixed position, and thereafter driving of the hydraulic cylinder 12 stops. Next, the process proceeds to "expander operation" in step S40, and the expander 2 is actuated to start the operation. After the operation of the expander 2 in step S40 is performed and ends, the process proceeds to return and the present control flow ends.

According to the control described above, during operation stop of the expander (piston-type expander) 2 (for example, before starting or immediately after stopping), the rotational torque of the first engaging member 10 and the output shaft 5 generated by pressing the second engaging member 11 onto the first engaging member 10 by the hydraulic cylinder (drive device) 12 is transmitted to the plurality of pistons 3a, 3b via the rotation swash plate 4, and thus control for adjusting the positions of the plurality of pistons 3a, 3b is performed.

According to the control described above, before the expansion machine 2 is started, the hydraulic cylinder 12 is driven to press the second slanting surfaces 11a onto the first slanting surfaces 10a to adjust the positions of the plurality of pistons 3a, 3b, then, the second slanting surfaces 11a are separated from the first slanting surfaces 10a, the driving of the hydraulic cylinder 12 is stopped, and thereafter the control for starting the expander 2 can be performed.

After the positions of the plurality of pistons 3a, 3b are adjusted by pressing the second slanting surfaces 11a onto the first slanting surfaces 10a, the hydraulic cylinder 12 is stopped, thereafter the expander 2 is started, the control can also be performed to separate the second slanting surfaces 11a from the first slanting surfaces 10a by the rotational torque of the output shaft 5 and the first engaging member 10 in the lock direction of the one-way clutch 8 generated at the time of starting. In this case, power for returning the hydraulic cylinder 12 to a return position is not required, which is advantageous for saving energy consumption. However, since the hydraulic cylinder 12 is not returned to the return position accurately, during the position adjustment of the pistons 3a, 3b, it is necessary to adjust the pushing amount of the second engaging member 11 by the hydraulic cylinder 12 each time according to the phase of the output shaft 5.

In the operation method for a piston-type expander of the embodiment of the present disclosure, before the piston-type expander 2 is started, it is determined whether or not to need to adjust the positions of the pistons 3a, 3b of the piston-type expander 2. In a case where it is determined that the positions of the pistons 3a, 3b need to be adjusted, the second engaging member 11 is pressed onto the first engaging member 10 and the output shaft 5 is rotated by the rotation torque of the first engaging member 10 generated due to the pressing, and thus the positions of the pistons 3a, 3b can be adjusted.

Therefore, during stop of the piston-type expander 2, for example, before starting or immediately after stopping, the phase adjustment of the output shaft 5 and the position adjustment of the pistons 3a, 3b can be performed by a relatively simple configuration and operation of pressing the second engaging member 11 in the axial direction M of the output shaft 5.

This application is based on a Japanese Patent Application (P2018-028949) filed on Feb. 21, 2018, the contents of which are incorporated herein by reference.

INDUSTRIAL APPLICABILITY

The operation system and operation method for a piston-type expander of the present disclosure are useful in adjusting the position (phase) of the piston of the piston-type expander.

LIST OF REFERENCE NUMERALS 1 operation system for a piston-type expander
2 piston-type expander
3a, 3b piston
4 rotation swash plate
5 output shaft
6 fluid inlet
7 fluid outlet
8 one-way clutch
9 phase determination mechanism
10 first engaging member
10a first slanting surface
11 second engaging member
11a second slanting surface
12 hydraulic cylinder (drive device)
13 control device
14 oil temperature sensor
15 vehicle power shaft
W working fluid
P power for a vehicle

The invention claimed is:

1. An operation system for a piston-type expander, comprising:
   a first engaging member which is fixed on an output shaft of the piston-type expander, rotates together with the output shaft, and has a first slanting surface;
   a second engaging member which is rotatably disposed on the output shaft, and has a second slanting surface; and
   a drive device which, while keeping a rotation direction of the second engaging member around the output shaft fixed, moves the second engaging member in an axial direction of the output shaft to press the second slanting surface onto the first slanting surface, converts a pressing force of the second engaging member in the axial direction into a rotational torque of the first engaging member and the output shall at a contact surface of the second slanting surface and the first slanting surface, and causes the first engaging member to rotate together with the output shaft.

2. The operation system according to claim 1, further comprising:
   a control device which performs a control for adjusting positions of a plurality of pistons during operation stop of the piston-type expander by transmitting the rotational torque, which is generated by pressing the second engaging member onto the first engaging member by the drive device, to the plurality of pistons via a rotation swash plate coupled to the output shaft.

3. The operation system according to claim 2,
   wherein before the piston-type expander starts,
   the control device performs a control in which after the drive device is driven to press the second slanting surface onto the first slanting surface to adjust positions of the plurality of pistons, the second slanting surface is separated from the first slanting surface and the drive device is stopped, and thereafter the piston-type expander is started.

4. An operation method for a piston-type expander in an operation system for the piston-type expander according to claim 1, the operation method comprising the steps of:
  before the piston-type expander is started,
  determining whether or not to need to adjust a position of a piston of the piston-type expander; and
  adjusting, in a case where it is determined that the position of the piston needs to be adjusted, the position of the piston by pressing the second engaging member onto the first engaging member to cause the output shaft to rotate by a rotational torque of the first engaging member generated by the pressing.

* * * * *